(12) United States Patent
Zimmerman

(10) Patent No.: US 8,376,608 B2
(45) Date of Patent: Feb. 19, 2013

(54) ENERGY-SAVING STATIC STIRRING APPARATUS FOR AUTOMATICALLY STIRRING A FLUID

(76) Inventor: Israel Harry Zimmerman, Los Angeles, CA (US)

( * ) Notice: Subject to any disclaimer, the term of this patent is extended or adjusted under 35 U.S.C. 154(b) by 0 days.

(21) Appl. No.: 13/285,110

(22) Filed: Oct. 31, 2011

(65) Prior Publication Data

US 2012/0045561 A1  Feb. 23, 2012

Related U.S. Application Data

(60) Provisional application No. 61/473,922, filed on Apr. 11, 2011.

(51) Int. Cl.
  *B01F 5/06* (2006.01)
  *B01F 15/06* (2006.01)
(52) U.S. Cl. ......... 366/144; 366/337; 366/340; 426/519
(58) Field of Classification Search .......... 366/144–146, 366/336–341, 348–349; 426/237–244, 519–520
See application file for complete search history.

(56) References Cited

U.S. PATENT DOCUMENTS

| | | | | |
|---|---|---|---|---|
| 1,627,187 A | * | 5/1927 | Larsen | 126/387.1 |
| 4,441,823 A | * | 4/1984 | Power | 366/167.1 |
| 4,600,544 A | * | 7/1986 | Mix | 261/79.2 |
| 6,615,872 B2 | * | 9/2003 | Goebel et al. | 138/38 |
| 6,706,179 B2 | * | 3/2004 | Lin | 210/222 |
| 2007/0070807 A1 | * | 3/2007 | Bracht et al. | 366/340 |

OTHER PUBLICATIONS

TELEBRANDS, "Robostir It Stirs So You Don't Have to! User and Care Guide", Mar. 1, 2010, 8 pages.
I. H. Zimmerman, "Declaration of Israel Harry Zimmerman Under 37 C.F.R. 1.56", Feb. 17, 2012, 12 pages.

* cited by examiner

*Primary Examiner* — Charles E Cooley
(74) *Attorney, Agent, or Firm* — Walter W. Duft

(57) ABSTRACT

An energy-saving static stirring apparatus for automatically stirring a fluid includes a deflector adapted for stationary placement in a container that holds a fluid for boiling. The deflector may include at least one friction contact point for frictionally engaging the container to prevent movement of the deflector. An inner portion of the deflector may be configured for placement proximate to a center of the container. An outer portion of the deflector may be configured for placement proximate to a side of the container. One or more deflector ramps define one or more vent openings to impart lateral movement to heated fluid currents and/or vapor bubbles moving upwardly away from a heat source below the container and to redirect the fluid currents and/or vapor bubbles into a swirling motion that stirs the fluid without movement of the deflector.

19 Claims, 9 Drawing Sheets

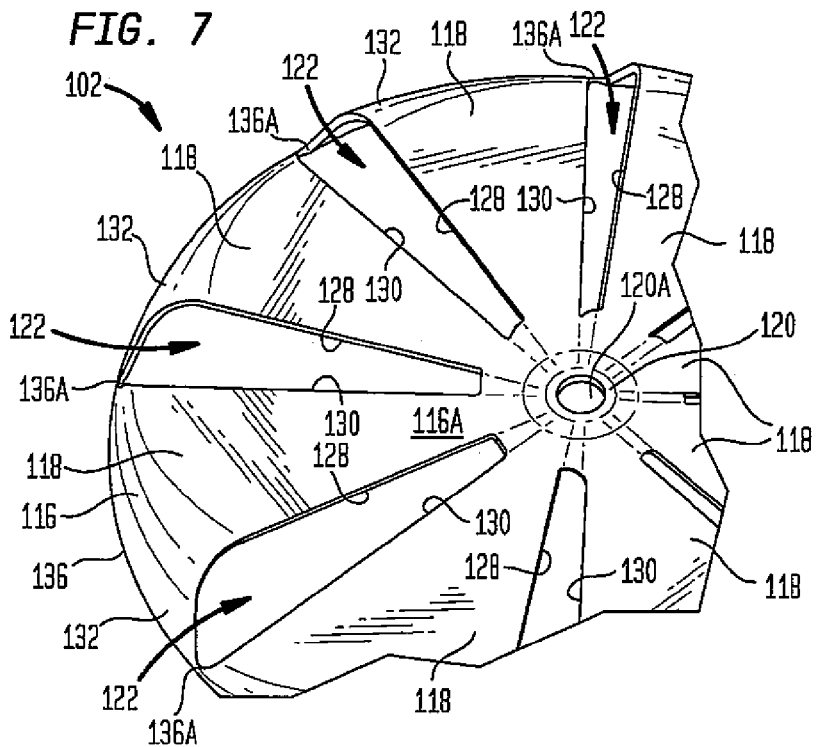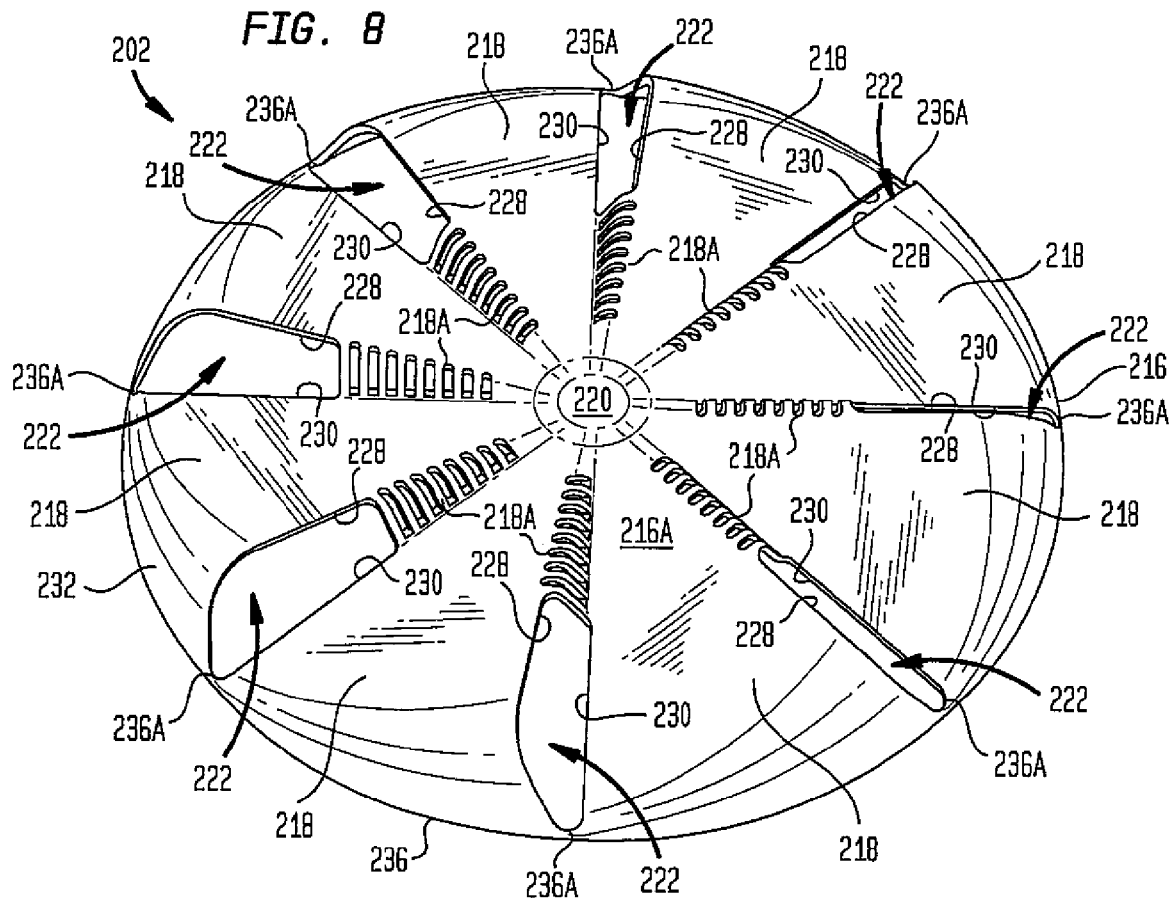

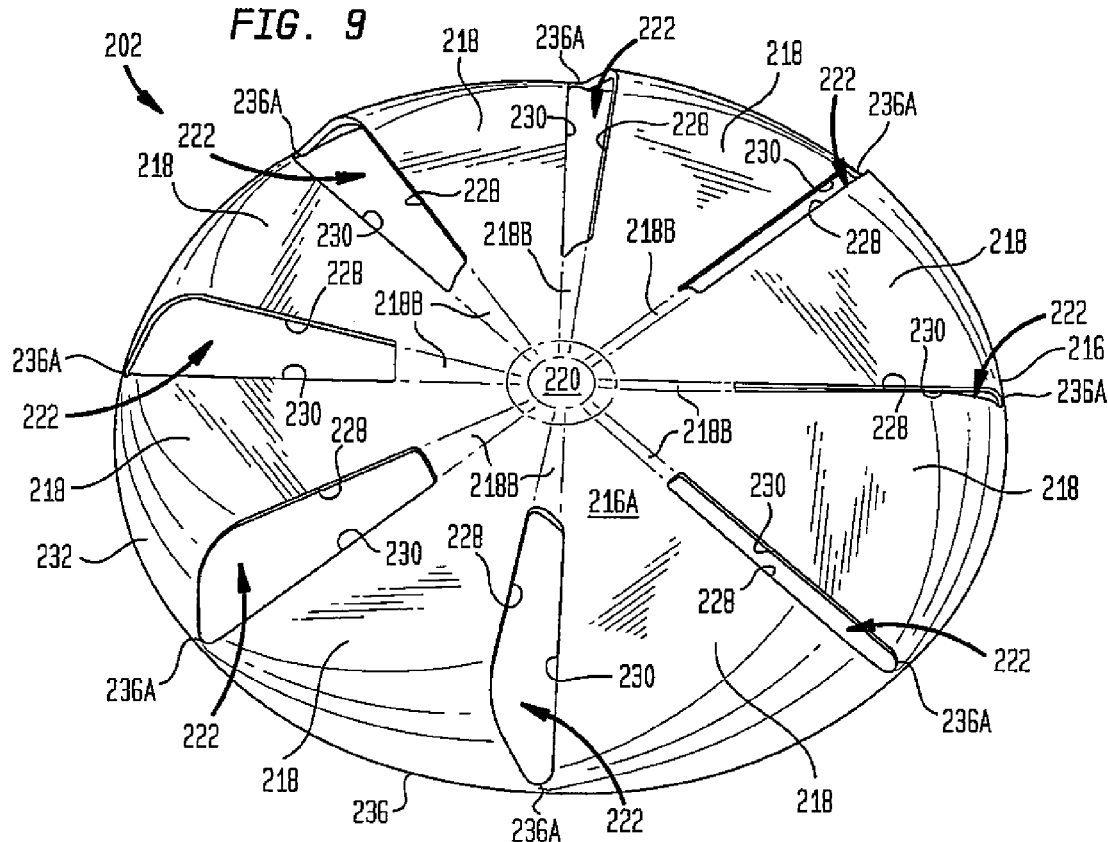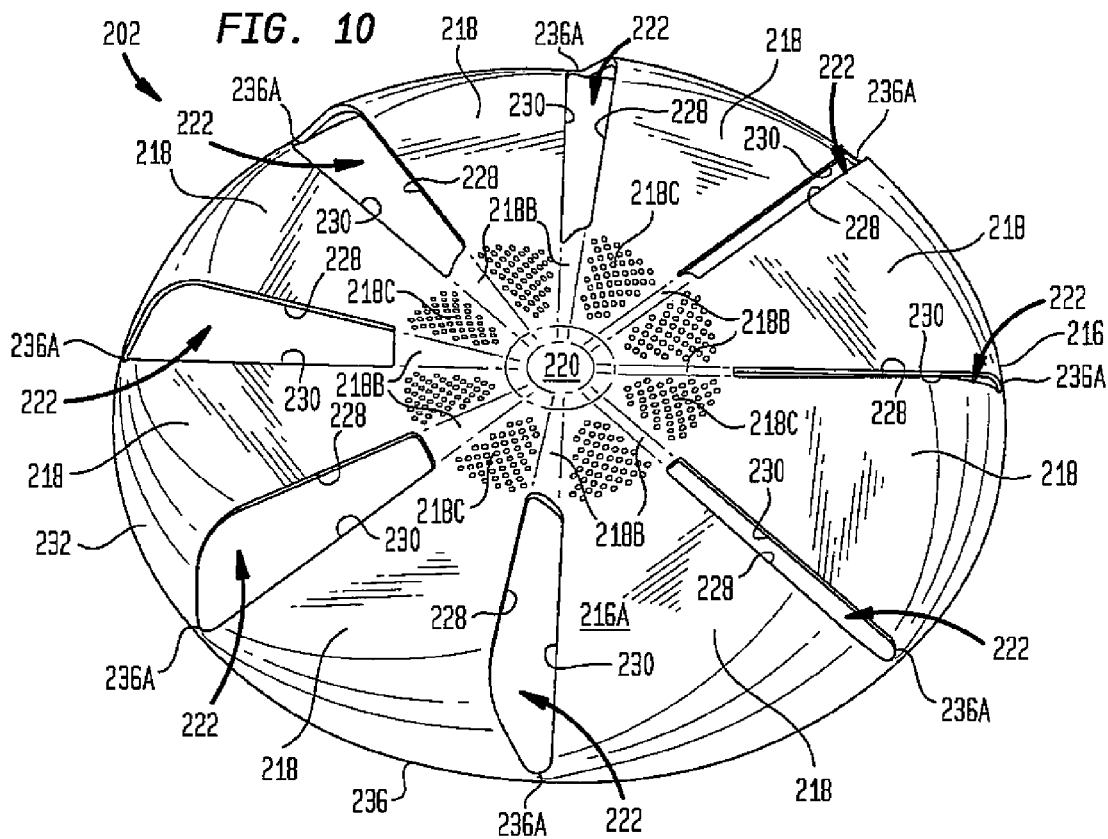

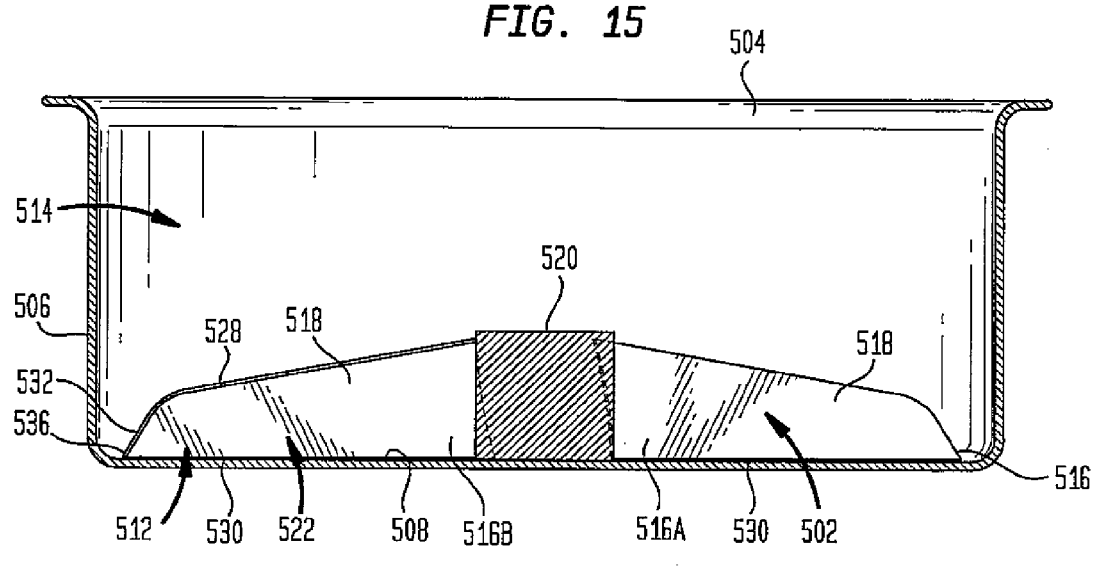
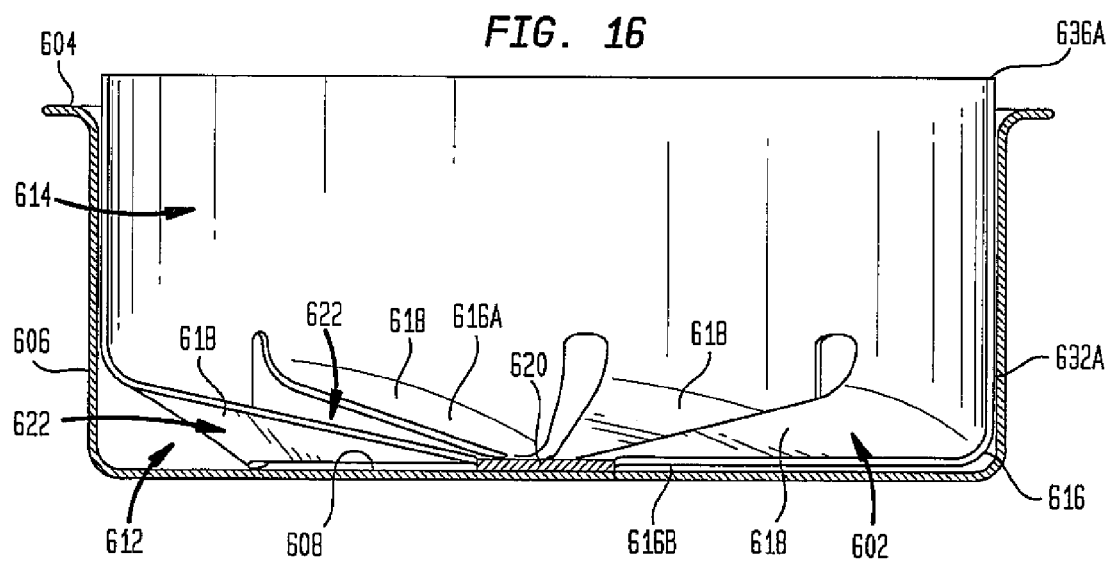

ENERGY-SAVING STATIC STIRRING APPARATUS FOR AUTOMATICALLY STIRRING A FLUID

CROSS-REFERENCE TO RELATED APPLICATIONS

This application claims priority to and the benefit under 35 U.S.C. 119(e) of U.S. Provisional Application No. 61/473,922 filed on Apr. 11, 2011. The entire contents of said Provisional Application No. 61/473,922 are hereby incorporated by this reference as if fully set forth herein.

BACKGROUND

1. Field

The present disclosure relates to cooking and cooking apparatus. More particularly, the disclosure concerns a device for stirring a food-containing fluid medium during boiling. Still more particularly, the disclosure pertains to a static stirring device for automatically stirring a fluid with increased energy efficiency. Static stirring for non-cooking applications is also contemplated.

2. Description of the Prior Art

By way of background, boiling is a common technique used for cooking, heating or otherwise preparing food for human consumption. However, although boiling is commonplace in food preparation, the boiling process carries certain limitations. For example, most recipes require at least some attention to stirring so as not to burn or otherwise detrimentally affect the food being prepared. In addition, most pots, pans and other cooking containers used for boiling are not perfectly uniform and in some instances the heating source is not evenly distributed. This can result in hot spots that create boiling channels wherein one portion of the container has more escaping vapor bubbles (either by volume or intensity) while the other side has relatively few. The net result is uneven cooking and food that may congeal in one area of the container, thereby preventing adequate intermixing of all flavored ingredients.

SUMMARY

A static stirring apparatus automatically stirs a fluid without the use of energy-consuming moving parts. Advantageously, the stirring apparatus significantly reduces the amount of external heat required to produce boiling-induced intermixing of food (or other fluid-born constituents). As a result, processes that rely on boiling (such as cooking) require less energy. The stirring apparatus includes a deflector structure (deflector) adapted for stationary placement in a container that holds a fluid for boiling food or other materials. In accordance with example embodiments disclosed herein, the deflector includes at least one friction contact point for frictionally engaging the container to prevent deflector movement. An inner portion of the deflector is configured for placement proximate to a center of the container. An outer portion of the deflector is configured for placement proximate to a side of the container. One or more stationary deflector ramps define one or more vent openings that provide fluid pathways from a lower side of the deflector to any upper side thereof. The one or more deflector ramps and vent openings are configured to impart lateral (e.g., tangential) movement to heated fluid currents and/or vapor bubbles moving upwardly away from a heat source below the deflector, and to redirect the fluid currents and/or vapor bubbles into a swirling motion that stirs the fluid without movement of the deflector.

BRIEF DESCRIPTION OF THE DRAWINGS

The foregoing and other features and advantages will be apparent from the following more particular description of example embodiments, as illustrated in the accompanying Drawings, in which:

FIG. 7 is a partial perspective top view showing an alternative stirring apparatus that may be constructed in accordance with the design principles set forth herein;

FIG. 8 is a perspective top view showing another alternative stirring apparatus that may be constructed in accordance with the design principles set forth herein;

FIG. 9 is a perspective top view showing another alternative stirring apparatus that may be constructed in accordance with the design principles set forth herein;

FIG. 10 is a perspective top view showing another alternative stirring apparatus that may be constructed in accordance with the design principles set forth herein;

FIG. 15 is a side cross-sectional centerline view showing another alternative stirring apparatus that may be constructed in accordance with the design principles set forth herein, with the stirring apparatus being situated in a container in an operational configuration;

FIG. 16 is a side cross-sectional centerline view showing another alternative stirring apparatus that may be constructed in accordance with the design principles set forth herein, with the stirring apparatus being situated in a container in an operational configuration;

DETAILED DESCRIPTION OF EXAMPLE EMBODIMENTS

Introduction

Figure 1:
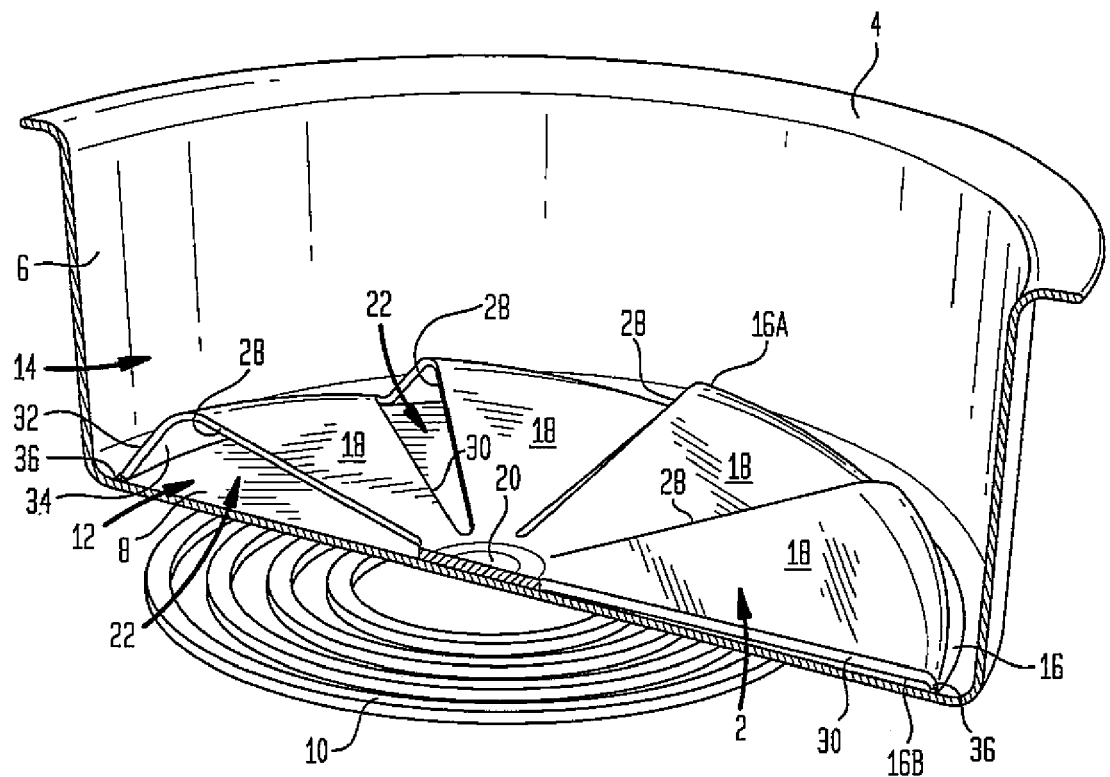
FIG. 1 is a perspective cross-sectional centerline view showing a stirring apparatus that may be constructed in accordance with the design principles set forth herein, with the stirring apparatus being situated in a container in an operational configuration.

The present disclosure describes embodiments of a static stirring apparatus that, by its construction and design, and without requiring any moving parts, insures that boiling fluids containing food or other materials will continually stir and mix when boiling within a container, such as a cooking container or other fluid heating device. Advantageously, the stirring apparatus automatically stirs without the use of energy-consuming moving parts. The stirring apparatus operates by redirecting the movement of a boiling fluid that would otherwise be in a random and disorganized state within the container. Redirecting the fluid causes it to act in a predictable and organized manner by creating a whirlpool effect that promotes a self-stirring action. Due to its unique design, the stirring apparatus significantly reduces the amount of external heat required to produce boiling-induced intermixing of food or other fluid-born constituents. Processes that rely on boiling (such as cooking) therefore require less energy.

Example embodiments of the disclosed stirring apparatus utilize a static fluid and vapor deflector structure (hereinafter "deflector") adapted for stationary placement in a container. The deflector may have a concave, convex or flat configuration, such that the deflector's overall shape may be plate-like, bowl-like, pan-like, dome-like, etc. The deflector is designed to frustrate the natural rise and upward trajectory of convective fluid currents and/or vapor bubbles that are inherent in any boiling medium. To achieve this effect, the deflector is designed with one or more deflector ramps that form one or more vent openings that provide fluid pathways from a lower side to an upper side of the deflector. The deflector ramps and vent openings are configured to redirect fluid currents and/or vapor bubbles rising from the heat conductive bottom plate of the container so that they are forced to travel in a more lateral trajectory that includes a substantial tangential direction vector component (when viewing the stirring apparatus in plan view orientation). The lateral trajectory of the fluid currents and/or vapor bubbles influences the otherwise generally static (but bubbling) fluid within the cooking container so that the entire fluid volume will move in concert with rotational motion. The rotating fluid will carry with it any included food or other material so that there is a natural and continues stirring action. In addition, the continuous stirring will allow for more rapid evaporation of any boiling fluid as it forces a more efficient intermixing with the cooler ambient air that exists outside the apparatus.

The deflector may be designed to have at one or more static friction points for engaging the container (e.g., at the bottom and/or sides thereof) to aid and prevent wholesale dynamic movement of the deflector. This ensures that energy will not be absorbed by deflector movement that could diminish the available energy available for influencing the stirring effect on the fluid. The friction point need only be of sufficient resistance to insure that the deflector remains statically positioned when it is subjected to the dynamic stresses of a boiling fluid. Typically, any point of contact between the deflector and the container will form a friction point if the deflector has sufficient inherent mass and weight. In that case, it will usually be sufficient to simply rest the deflector on the container's heat conductive bottom plate, such that there need not be any special connections or other means for affixing the deflector. However, connective attachments could be used if desired. The deflector may be formed out of any suitable material, including metals (e.g., aluminum, copper, stainless steel, etc.) and non-metals (e.g., heat-resistant polymers). If the deflector does not affirmatively attach to the container, it will preferably have sufficient mass so that its weight and frictional contact with the container will prevent it from moving during use.

The deflector may be thought of as creating two distinct fluid zones within the container, namely, a lower zone below the deflector and an upper zone above the deflector. The lower zone is a metered fluid area that contains a predictable and stable volume of fluid regardless of the total fluid volume contained in the container itself. The fluid that sits in the lower zone will be in direct communication with both the conductive bottom plate of the container and the bottom side of the deflector. The upper zone has a variable fluid volume that can be adjusted by the user depending on the needs and objectives of the cooking task. The fluid in the upper zone will be partially shielded from the direct influence of the heat source by the deflector, which acts as an imperfect intermediate blanket that allows for seepage of fluids between zones but at the same time prevents a wholesale mixing of the two zones. The deflector may be oriented generally on a horizontal plane. Rising convective fluid currents and/or vapor bubbles provide a force for "pushing" fluid from the lower zone into the upper zone. The deflector interferes with and redirects the rising fluid currents and/or vapor bubbles into a more lateral (e.g., tangential) trajectory due to the deflector ramps and vent openings.

In use, a user may place the deflector in a container and fill the container with a fluid capable of being boiled (such as water) to at least a point where the deflector is submerged in the fluid. Either prior to or following the addition of one or more items of food or other material to be cooked or heated, the fluid will be subjected to heat energy, which will be transferred via the container's conductive bottom plate from a heating source such as a stove. As the fluid begins to boil, conductive fluid currents and/or vapor bubbles are free to rise and accelerate while in the lower zone and until they make contact with the underside of the deflector. At that point, the deflector will frustrate the natural buoyancy of the rising fluid currents and/or vapor bubbles and force them to travel across the one or more deflector ramps that are specifically designed to bend the upward trajectory to a more lateral (e.g., tangential) movement and vent the fluid currents and/or vapor bubbles through the one or more vent openings. As the fluid currents and/or vapor bubbles exit the deflector ramps and vent openings into the upper zone fluid, they will influence the otherwise generally static fluid in that zone and over time will create enough inertia to effect a whirlpool movement so that the upper zone fluid remains in a state of perpetual stirring. The mobility of the fluid will generally be proportionate to the heat energy intensity introduced via the lower zone fluid, and so turning the heat up or down the heat will also control the rate and intensity of the stirring (and associated evaporation). Advantageously, the deflector plates and vent openings provide a guided flow pathway for accelerating the fluid currents and/or vapor bubbles while redirecting their movement. This acceleration characteristic lowers the amount of applied heat required to achieve a given level of food-agitating action, Thus, recipes prescribing a given level of boiling (e.g., from a simmer to a full boil) will benefit from the fluid current and/or vapor bubble acceleration effect provided by the disclosed deflector designs due to their inherent energy-saving characteristics.

Embodiments of the stirring apparatus may be designed so that the deflector generally mimics the footprint size of the container's conductive bottom plate. In such embodiments, a significant portion of the conductive bottom plate may be covered by the deflector (e.g., at least 50% when looking down on the deflector in a plan view direction) so as to effectuate a greater incremental temperature differential between the fluid that is above the deflector (upper fluid zone) and the fluid below that is in direct contact with the heated conductive bottom plate (lower fluid zone) and closest to the radiating heat source, such that the deflector in effect it acts as an imperfect blanket. The deflector is designed to allow the fluid to seep through and mix between the upper and lower zones. However, by partially blocking the wholesale free mixing of the fluid zones in the container, the deflector can create a slightly exaggerated temperature difference between the two zones to create a more ferocious thermal current. This energy is then redirected into a more lateral (e.g., tangential) force creating the desired whirlpool effect.

The deflector allows fluid to flow both out of and above the deflector ramps and into and under the deflector ramps during operation. For example, when a fluid is heated through the container's conductive bottom plate, it rises as a convective fluid current. However, because the container has a closed bottom and side portion, the volume occupied by the rising fluid mass cannot be replenished from any method other than utilizing the existing fluid that is already contained within the confines of the container that the rising fluid shares. As a result, at least some of the replacement fluid will be drawn from fluid that is cooler and resides in the upper zone above the deflector. The net result is movement that creates a cycle of fluid movement that passes both upwardly from the lower fluid zone below the deflector to the upper fluid zone above the deflector, as well as some fluid that will travel downwardly and move back through the deflector to return from the upper fluid zone to the lower fluid zone.

Accommodating the cycling of conductive fluids both under and above the deflector can be accomplished in various ways. For example, the deflector may have a concave or convex general shape, so that there is a sloping contour away or toward the center to create natural flow channels and vent openings for hotter convective fluid currents that tend to travel "up" the contour while providing a natural pathway for cooler fluid to flow back down and under the deflector. The return fluid may flow back to the lower zone via the same deflector ramp vent openings that expel rising fluid currents and/or vapor bubbles into the upper zone. If desired, channels or crevasses may be provided on the deflector to influence the specific course of flow for either rising or descending fluid currents and/or vapor bubbles. The deflector may also be designed with separate fluid return openings that are distinct from the deflector ramp vent openings. For example, a concave deflector may be provided with a central low point opening for back-flow of relatively cooler fluid from the upper fluid zone into the lower fluid zone. Also, strategic holes may be designed into the deflector or its deflector ramps to facilitate such fluid back flow. If the deflector is spaced from the side of the container, the resultant tolerance gap may likewise provide a return fluid pathway, especially if the deflector is convex and its periphery is lower than its center.

A radial outer peripheral portion of the deflector may include either an integral sidewall or may form a virtual sidewall by virtue of its peripheral contour generally conforming to the contour of the side of the container and being in close proximity therewith. This will block radial escape of the rising fluid currents and/or vapor bubbles from the outside edge of the deflector and urge them laterally (e.g., tangentially) out the deflector ramp vent openings. Note that the latter configuration where the deflector is without an integral sidewall does not require that the periphery of the deflector to be in actual contact with the side of the container. It is generally permissible for the deflector to be spaced from the container side portion, so long as the side portion is close enough to assist in at least some lateral (e.g., tangential) deflection of the fluid currents and/or vapor bubbles to influence the desired swirling effect.

Example Embodiments

Turning now to FIGS. 1-6, one possible embodiment is shown of a stirring apparatus 2 that may be constructed in accordance with the present disclosure. The stirring apparatus 2 is adapted to be received in a container 4, such as a cooking pot or the like. The container 4 has an outer side wall 6 and a heat conductive bottom plate 8 that will typically be substantially horizontal, substantially planar and substantially made of solid heat conductive material. The container's bottom plate 8 acts as a heat-transfer conduit or pathway between a heating source 10 (such as a stove top electric heating element or gas burner) and a fluid-holding portion of the container 4. The container's fluid holding portion is adapted to receive a fluid (not shown). When the stirring apparatus 2 is positioned in its operational position in the container 4 (as in FIGS. 1-2), the container will effectively comprise a lower fluid zone 12 located below the stirring apparatus 2 and an upper fluid zone 14 located above the stirring apparatus.

In the illustrated embodiment, the stirring apparatus 2 is configured as a deflector structure ("deflector") 16 that is generally circular in shape when viewed in plan and generally concave when seen in a side view orientation. The deflector 16 has an upper side 16A and a lower side 16B. The generally concave shape of the deflector 16 is in reference to the upper side 16A. As described in more detail below, other embodiments may have other deflector configurations, such as convex or generally flat. In the illustrated embodiment, the deflector 16 has a set of eight closely spaced deflector ramps 18 extending radially outwardly from a lower central hub portion 20 of the deflector. In other embodiments, there might be fewer (e.g., 1-7) or additional (e.g., >8) deflector ramps.

The deflector ramps 18 are generally pie-shaped in the illustrated embodiment. They are designed with a gradual upslope both radially and across the chord dimension of each deflector ramp. This creates vent openings 22 of gradually increasing height as each deflector ramp travels away from the central hub 20. This can be seen by comparing vent opening region 24 with vent opening region 26 in FIG. 3. Sloping each deflector ramp 18 upwardly in the chord direction ensures that the deflector ramp's upper edge 28 is always higher than its lower edge 30. This also means that the upper edge 28 is angled upwardly relative to the lower edge 30 for at least a portion of its length when the deflector 16 is viewed from the side and in a direction that is normal to either the lower edge or the upper edge of the deflector plate 18 being considered.

Figure 2:
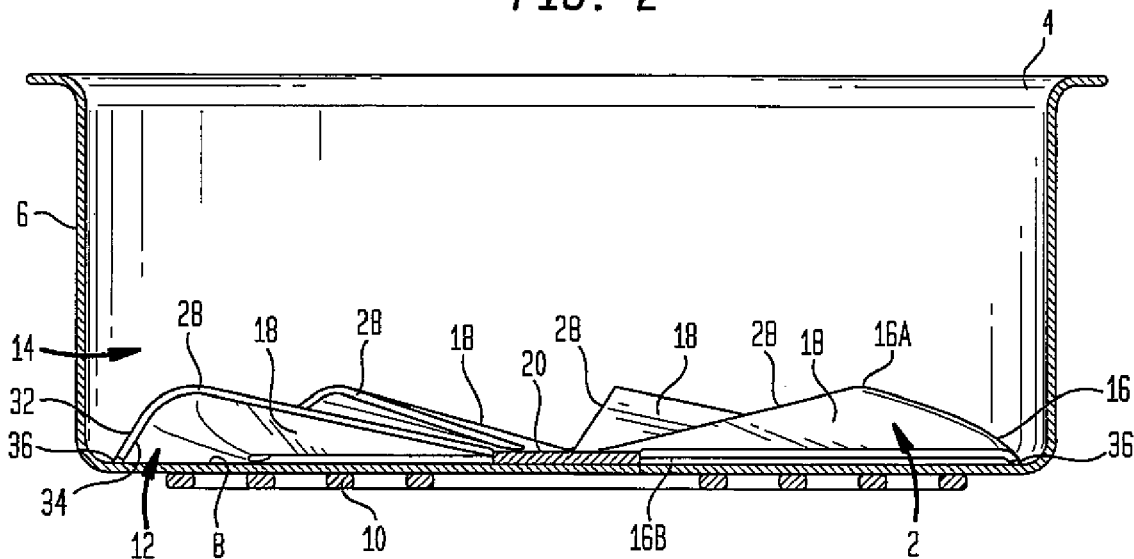
FIG. 2 is side cross-sectional centerline view of the stirring apparatus and container of FIG. 1.
Figure 3:
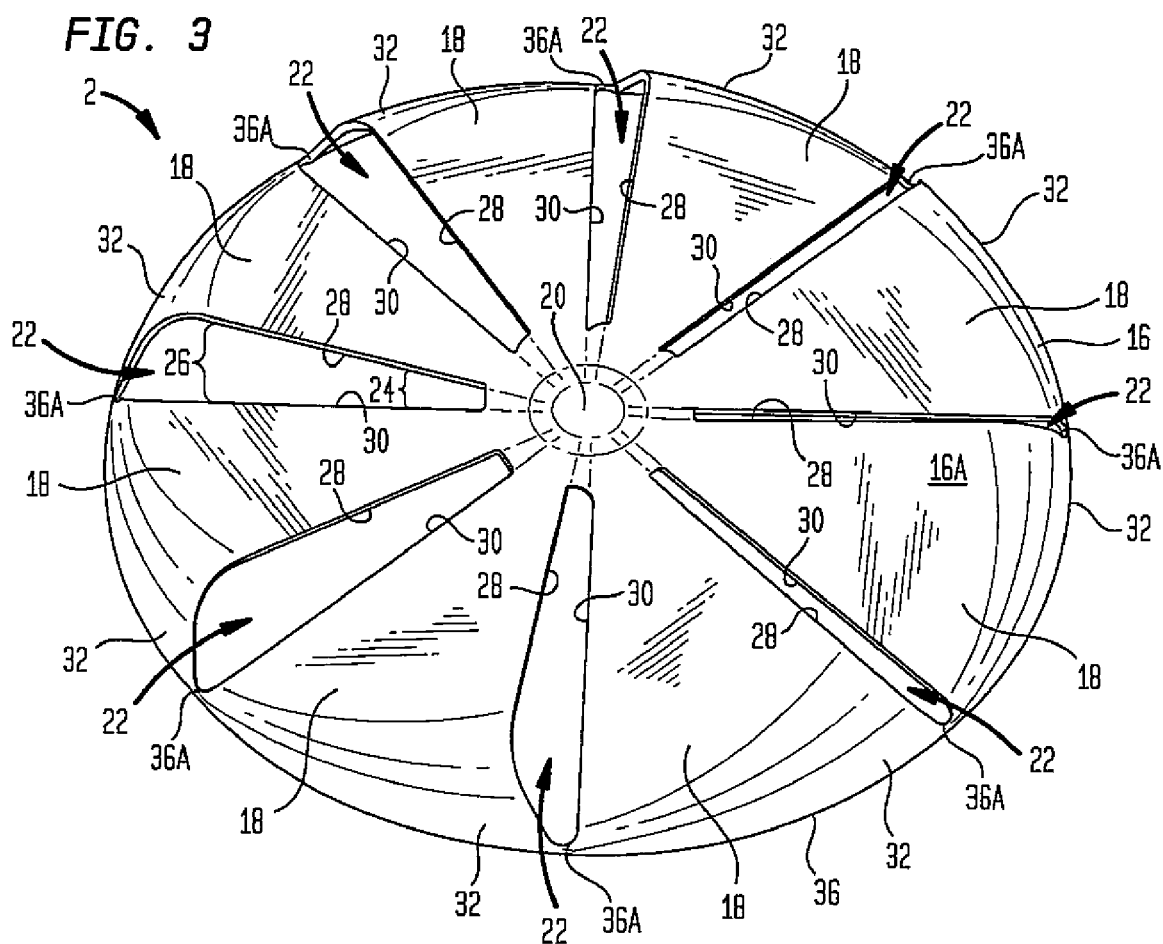
FIG. 3 is a perspective top view of the stirring apparatus of FIG. 1.
Figure 4:
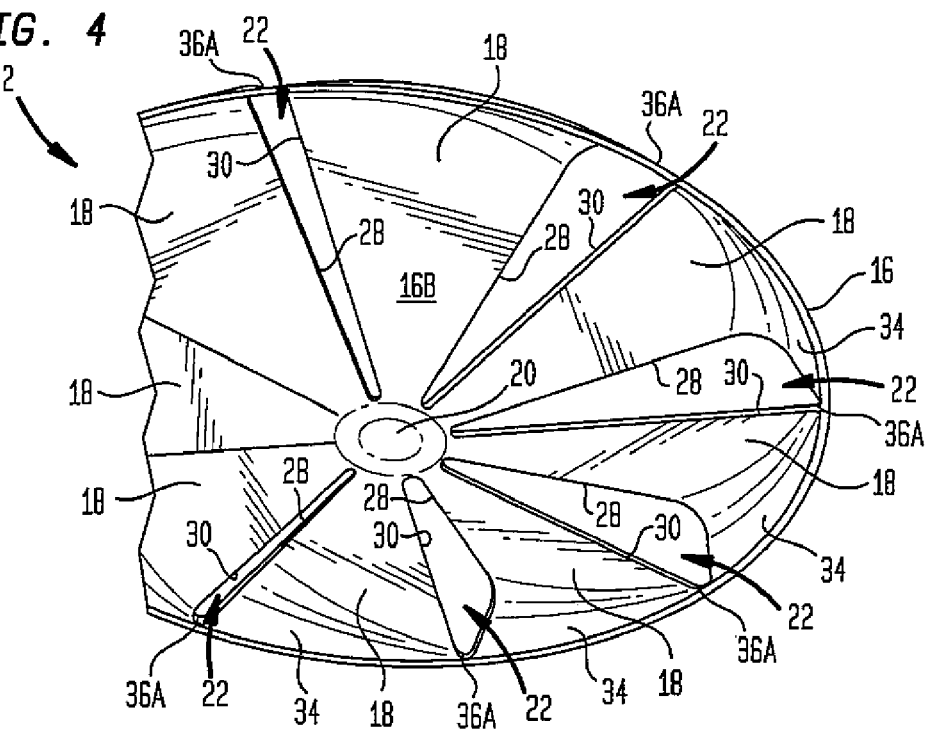
FIG. 4 is a partial perspective bottom view of the stirring apparatus of FIG. 1.
Figure 5:
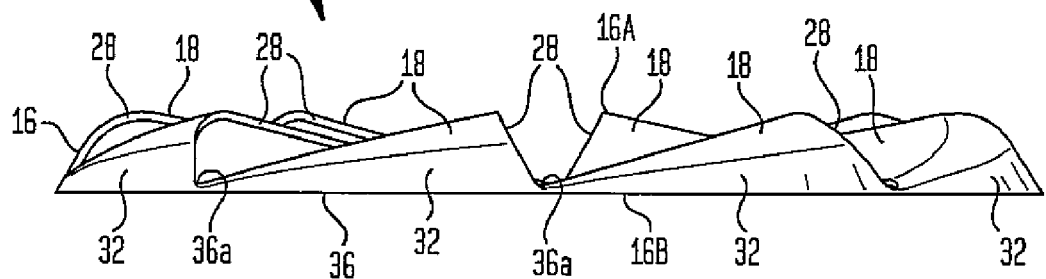
FIG. 5 is a side view of the stirring apparatus of FIG. 1.

In FIG. 2, this angling may be seen with respect to both the right-hand and left-hand deflector plates 18 depicted in the foreground of FIG. 2. In this embodiment, both the upper edge 28 and the lower edge 30 of each deflector plate 18 emanate from the central hub portion 20 of the deflector 16. The upper edge 28 extends from the hub portion 20 at a higher angle than the lower edge 30. As can be seen from the left-hand deflector plate 18 in the foreground of FIG. 2, the upper edge 28 angles upwardly away from the lower edge 30 for a major portion of its length, namely, to the radial outer end of the deflector plate where a downwardly extending side wall begins (see element 32, described in more detail below). Stated another way, the angle made by the upper edge 28 relative to a substantially horizontal reference surface, such as the bottom plate 8 of the container 4, is greater than the corresponding angle made by the lower edge 28 relative to the container's bottom plate. In fact, as additionally shown in FIG. 1, the lower edge 30 in the illustrated embodiment may be substantially horizontal so as to be substantially parallel to the container's bottom plate 8. In contrast, the upper edge 28 may be angled upwardly relative to the container's bottom plate 8 as much as 10, 20 or 30 degrees or more, depending on design goals. The result will be a bias upwardly, outwardly and laterally (e.g., tangentially) for rising fluid currents and/ or vapor bubbles moving from the lower fluid zone 12 to the upper fluid zone 14 within the container 4.

FIGS. 1-2 also show that both the upper edge 28 and the lower edge 30 of each deflector plate 18 in the illustrated embodiment are substantially straight over a major portion of their length when the deflector 16 is seen in a side view orientation and normal to either the upper edge or the lower edge of the deflector plate 18 being considered. Moreover, the lower edge 30 is in close proximity to the container's bottom plate 8. This minimizes the escape of rising fluid currents and/or vapor bubbles past the bottom edge 30 and maximizes the flow of fluid currents and/or vapor bubbles along the rising lower surface of the deflector ramps 18 to the upper edge 28, and out the vent openings 22. Positioning the bottom edge 30 in close proximity to the container's bottom plate 8 also helps block the wholesale back-flow of larger-sized solids from the upper fluid zone 14 to the lower fluid zone 12, preventing them from becoming trapped beneath the lowermost portions of the deflector plates 18.

Other embodiments may have different upper edge and lower edge configurations. For example, although it is generally desirable that the lower edge 30 of each deflector ramp 18 be substantially straight and horizontal in order to run parallel to the container's bottom plate 8, the upper edge 28 of each deflector ramp need not necessarily be straight. Moreover, although the upper edge 28 of each deflector ramp 18 is angled upwardly for its entire length in the deflector configuration shown in FIGS. 1-6, the upper edge could also angle horizontally or downwardly over some portion of its length.

It will be seen in FIGS. 1-6 that the deflector ramps 18 each have a non-twisting substantially planar configuration. However, twisting, warped or other non-planar configurations could also be used. For example, the deflector ramps 18 could have curved ramp surfaces that give each deflector ramp individually a concave or convex surface curvature. It will also be seen in FIGS. 1-6 that both the upper edge 28 and the lower edge 30 of each deflector ramp 18 are substantially straight when the deflector 16 is seen in a plan view orientation so that there is no significant curvature in the plan view radial direction. Other embodiments could use curved edges if desired. As can also be seen in FIG. 1, the upper edge 28 of each deflector ramp 18 has a substantially flat face. In an alternative embodiment, the upper edges 28 could have rounded or knife-edge faces. As can further be seen in FIG. 1, the deflector plates 18 have a substantially uniform material thickness from the upper edge 28 to the lower edge 30. Again, other embodiments may use other deflector plate configurations, such as a beveled design wherein the deflector plates 18 are thinner at the upper and lower edges 28 and 30 than at their mid-portions.

It should also be noted that the generally pie-shaped configuration of the deflector ramps 18 means that there is more deflector ramp area at the radial outer end of each deflector ramp than at the radial inner end. This imparts more lateral acceleration to rising fluid currents and/or vapor bubbles situated near the outer end of each deflector ramp 18 than to fluid currents and/or vapor bubbles situated near the inner end of each deflector ramp. The effect of this differential acceleration (coupled with the fact that the deflector 16 is convex) is to widen the radius of the resultant swirling pattern and increase the stirring motion imparted to the body of fluid within the upper fluid zone 6 of the container 4. The pie-shape of each deflector ramp 18 is produced in part by the upper edge 28 and the lower edge 30 being substantially equal in length so that the outer peripheral portion of each deflector ramp is a curve of substantially fixed radius whose center of curvature is the center of the central hub portion 20. Non-pie-shaped deflector ramp configurations may also be used.

In order to more precisely control the movement of the exiting fluid currents and/or vapor bubbles, a downward sloping peripheral sidewall 32 may be provided on the deflector 16. The sidewall 32 forms a crevice or curved channel 34 (see FIGS. 1, 2 and 4) at the radial outer end of each deflector ramp 18. The sidewall 32 works in concert with the upsloping deflector ramps 18 to redirect the fluid currents and/or vapor bubbles in a direction that includes a substantial tangential component. This forces the buoyant naturally rising fluid currents and/or bubbles to be precisely placed into the general fluid population at a desired angle of attack, thereby creating a force and momentum that results in the desired whirlpool rotation.

As best shown in FIGS. 3-6, the deflector 16 also includes a lower contact rim 36 that is continuous in nature due to the provision of a set of ramp-interconnection segments 36A. The ramp-interconnection segments 36A interconnect each pair of adjacent deflector ramps 18 and close the outer radial end of each vent opening 22, thereby lending structural rigidity to the deflector 16. As will be described in more detail below, the ramp-interconnection segments 36A may be eliminated in other embodiments. As can be seen in FIGS. 1-2, the lower contact rim 36 is configured to rest on the conductive bottom plate 8 of the container 4. The deflector's central hub 20 also rests on the bottom plate 8. This geometry provides radial inner and outer frictional contact points between the deflector 16 and the container 4. The frictional contact points prevent the dynamic forces of rising fluid currents and/or vapor bubbles from spinning or otherwise causing wholesale movement of the deflector 16. This ensures a stable planting of the deflector 16 to prevent movement that may have a detrimental effect on the intensity of the desired whirlpooling of the fluid in the upper zone fluid zone 14.

During operation of the stirring apparatus 2, a user will introduce heat energy from the heating source 10 to heat the conductive bottom plate 8 of the container 4. This will in turn heat the fluid in the lower fluid zone 12. As the fluid begins to boil, convective fluid currents and/or vapor bubbles in the lower zone begin to flow upwardly and make contact with the underside of the deflector 16. There, the fluid currents and/or vapor bubbles are redirected by the optimized angle of the deflector ramps 18, which utilize the natural locomotion of the rising fluid currents and/or vapor bubbles to redirect the trajectory into a more lateral motion. As previously stated, each deflector ramp 18 has a deflector ramp surface that extends from a lowermost ramp portion situated at the ramp lower edge 30 to an uppermost ramp portion situated at the ramp upper edge 28. Each vent opening 22 is defined by the upper edge 28 of one deflector ramp 18 and the lower edge 30 of an adjacent deflector ramp. As described in more detail below, other embodiments may have different vent opening configurations. The deflector ramps 18 of the deflector 16 shown in FIGS. 1-6 are generally "stacked" horizontally, with the heat conductive bottom plate 8 of the container 4 being situated below the deflector ramp stack. In between the deflector's horizontally "stacked" deflector ramp structure and the container's bottom plate 8 is the lower fluid zone 12, which provides an area for fluid to seep in and out of, thereby ensuring that some fluid will always be in direct contact with the bottom plate 8.

It should be noted that the deflector ramps 18 are not stacked vertically in the illustrated embodiment of FIGS. 1-6 insofar as the upper and lower edges 28 and 30 of adjacent deflector ramps do not overlap when looking down on the deflector 16 in a plan view direction. In fact, a slight gap can be maintained between adjacent deflector ramps 18 so that when the deflector 16 is seen in plan view orientation, the upper edge 28 of one deflector ramp will be spaced from the bottom edge 30 of the adjacent deflector ramp. In this configuration, each vent opening 22 will present an "open face" that slopes downwardly from the upper edge 28 of one deflector ramp 18 to the bottom edge 30 of the next adjacent deflector ramp.

Figure 6:
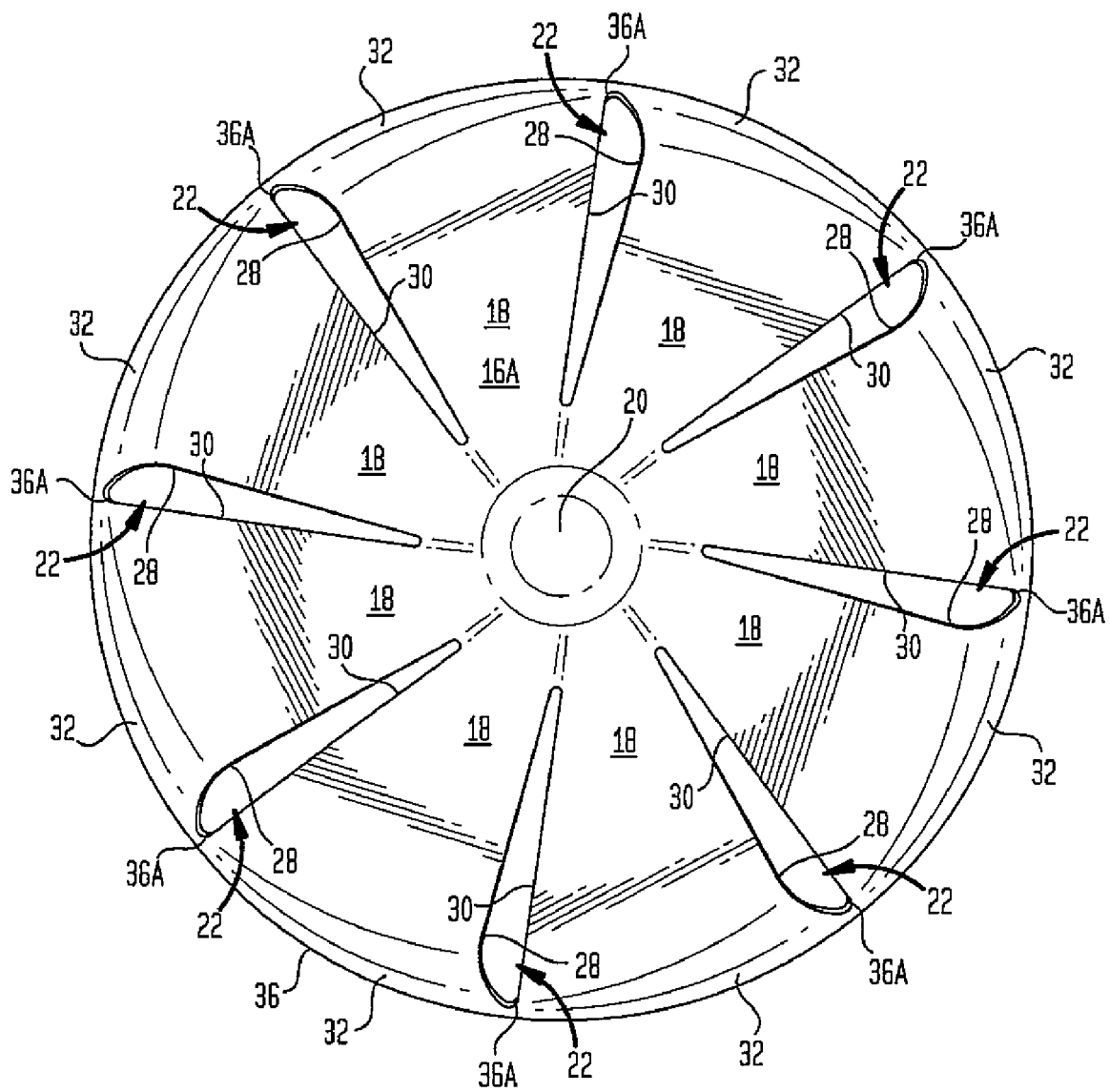
FIG. 6 is a top plan view of the stirring apparatus of FIG. 1.

As shown in FIG. 6, the upper edge 28 and the lower edge 30 of adjacent deflector ramps 18 are angled so that each individual vent opening 22 is slender when the deflector 16 is seen in a plan view orientation. This ensures that each vent opening 22 maintains a generally narrow width dimension (when seen in the plan view direction). Otherwise, the outer ends of the vent openings 22 could become too wide and thereby allow more fluid currents and/or vapor bubbles to simply rise upwardly without containing a deflector ramp 18. Note that the vent openings 22 were made wider, the plan view width projection of the deflector plates 18 would have to decrease. This would allow more of the rising fluid currents and/or vapor bubbles to travel vertically through the vent openings 22 from the lower fluid zone 12, thereby decreasing the effectiveness of the deflector 16. Thus, the deflector plates 18 are preferably sized relative to the vent openings 22 so that the area of the deflector plates (when seen in a plan view orientation) covers a substantial portion of the surface area of the container's heat conductive bottom plate 8. This configuration is best illustrated in FIGS. 1 and 6. Preferably, the deflector plates 18 will cover at least 50% of the surface area of the heat conductive bottom plate 8.

In other embodiments, the upper and lower edges 28 and 30 of adjacent deflector ramps 18 could be aligned vertically, such that the vent openings 22 extending between these edges would also be vertically oriented. In such embodiments, the deflector plates would effectively cover 100% of the surface area of the heat conducting bottom plate 8. In other embodiments, an overlapping deflector ramp construction could be used such that the deflector plates are at least partially vertically stacked. In such embodiments, the upper edge 28 of each deflector ramp 18 would extend horizontally beyond the lower edge 30 of the next adjacent deflector ramp 18. Such overlapping of adjacent deflector ramps will increase the chord length of each deflector ramp 18, and thus may impart additional lateral (tangential) velocity to the rising fluid currents and/or vapor bubbles. In these embodiments, the deflector plates 8 will again cover 100% of the surface area of the heat conducting bottom plate 8. As described below in connection with FIG. 15, vertical stacking of deflector plates may also be used in convex deflector configurations.

The lower fluid zone 12 underneath the lower side of the deflector 16 provides an imperfect incubation space for convective currents and/or vapor bubbles to form and travel upwardly with some velocity before coming into contact with the underside of the deflector plates 18. The fluid currents and/or vapor bubbles will accelerate as they exit out of the lower fluid zone 12 through the relatively narrow vent openings 22, and will be forcefully redirected into a more lateral (e.g., tangential) trajectory into the upper zone fluid zone 14. As the fluid in the lower fluid zone 12 heats to a boil and the lateral movement of the fluid currents and/or vapor bubbles becomes more vigorous, the action of the accelerated and redirected fluid currents and/or vapor bubbles becomes more pronounced and influences the remaining fluid residing in the upper fluid zone 14. The momentum due to the accelerated lateral movement of the fluid currents and/or vapor bubbles released into the upper fluid zone 14 produces a whirlpool effect that acts to create a self stirring environment in the upper zone.

Also, as the fluid currents and/or vapor bubbles rise and are forced through the deflector 16 into the upper fluid zone 14, a natural physical fluid void is created in the lower fluid zone 12. Because no new fluid can be introduced through the closed bottom plate 8 of the container 4, fluid must flow back into the lower fluid zone 12 from the upper fluid zone 14. Advantageously, the deflector 16 is situated in such a way that the fluid will be able to seep into the lower zone 12 from the upper zone 14 through the vent openings 22 integrated into the deflector itself. As described in more detail below, other embodiments may also utilize optional fluid return channels or openings that may be strategically placed at interior portions of the deflector. In other embodiments, an opening on the periphery of the deflector 16 remains open to facilitate fluid return as a result of a tolerance between the circumference of the side wall 6 of the container 4 and the outer circumference of the deflector.

Turning now to FIG. 7, another example embodiment is shown of a stirring apparatus 102 that may be constructed in accordance with the present disclosure. As can be seen, the stirring apparatus 102 is similar in most respects to the stirring apparatus 2 of FIGS. 1-6. This similarity is indicated by the use of corresponding reference numbers (incremented by 100) to indicate corresponding structure. The stirring apparatus 102 differs from the embodiment of FIGS. 1-6 due to the addition of an opening 120A in the central hub 120 of the deflector 116. The opening 120A provides a passage for fluid to travel from an upper fluid zone (not shown) above the deflector 116 to a lower fluid zone (not shown) below the deflector that is heated by a heating source.

Turning now to FIG. 8, another example embodiment is shown of a stirring apparatus 202 that may be constructed in accordance with the present disclosure. As can be seen, the stirring apparatus 202 is similar in most respects to the stirring apparatus 2 of FIGS. 1-6. This similarity is indicated by the use of corresponding reference numbers (incremented by 200) to indicate corresponding structure. The stirring apparatus 202 differs from the embodiment of FIGS. 1-6 due to the addition of blocking gates 218A incorporated into the corner areas at the radially inner connection points of the deflector ramps 218. The blocking gates 218A block the radial inner regions of the vent openings 222, but are slotted to allow fluid to travel from an upper fluid zone (not shown) above the deflector 116 to a lower fluid zone (not shown) below the deflector that is heated by a heat source. However, the blocking gates 218A will block the carrying of food or other contents other than fluid from flowing back under the deflector ramps 218 where the food could potentially get stuck in the narrow part of the vent openings. If desired, the stirring apparatus 202 of FIG. 8 may be further modified in the manner shown in FIGS. 9 and 10. In FIG. 9, the blocking gates 218A are solid rather than slotted. In FIG. 10, the blocking gates 218A are also solid. In addition, a plurality of small fluid return apertures 218C are formed on the deflector ramps 218 surrounding the central hub 220 of the deflector 216. The apertures 218C provide additional pathways for fluid in an upper fluid zone (not shown) above the deflector 216 to return to a lower fluid zone (not shown) below the deflector 216.

Figure 11:
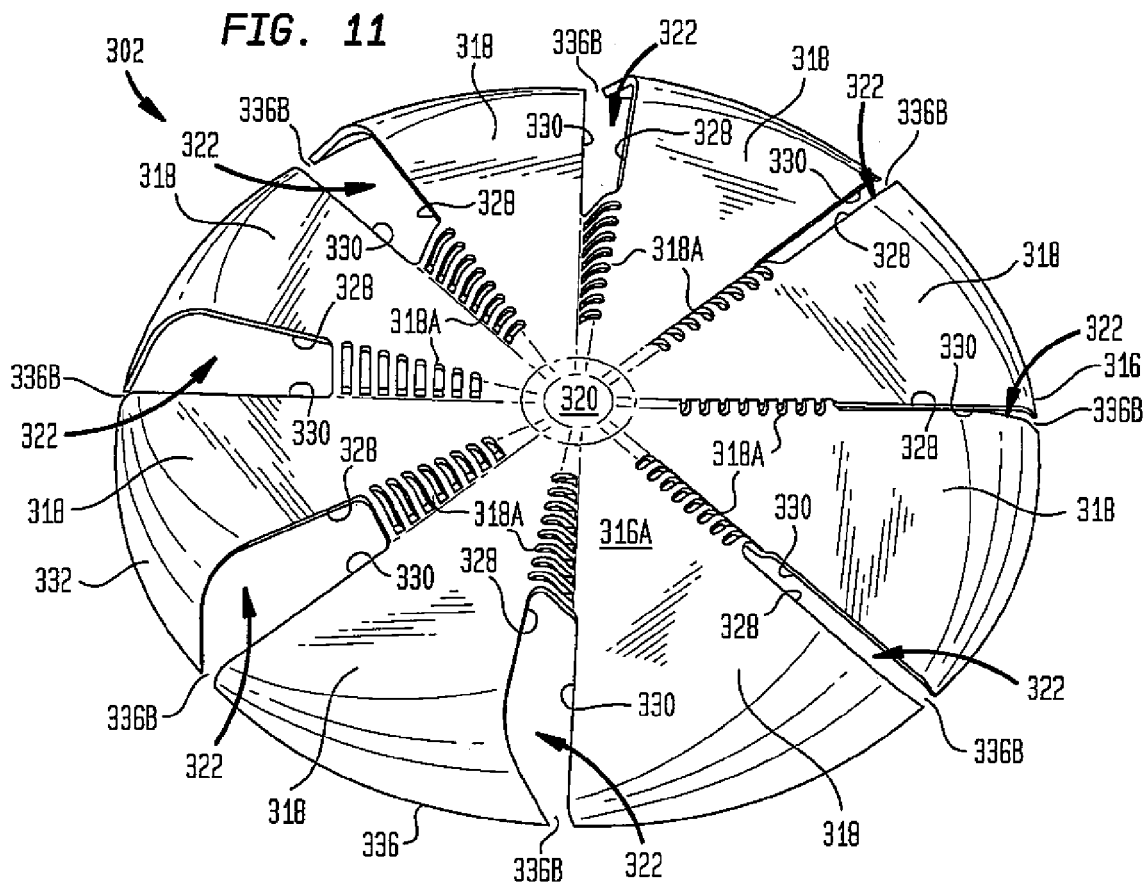
FIG. 11 is a perspective top view showing another alternative stirring apparatus that may be constructed in accordance with the design principles set forth herein.
Figure 12:
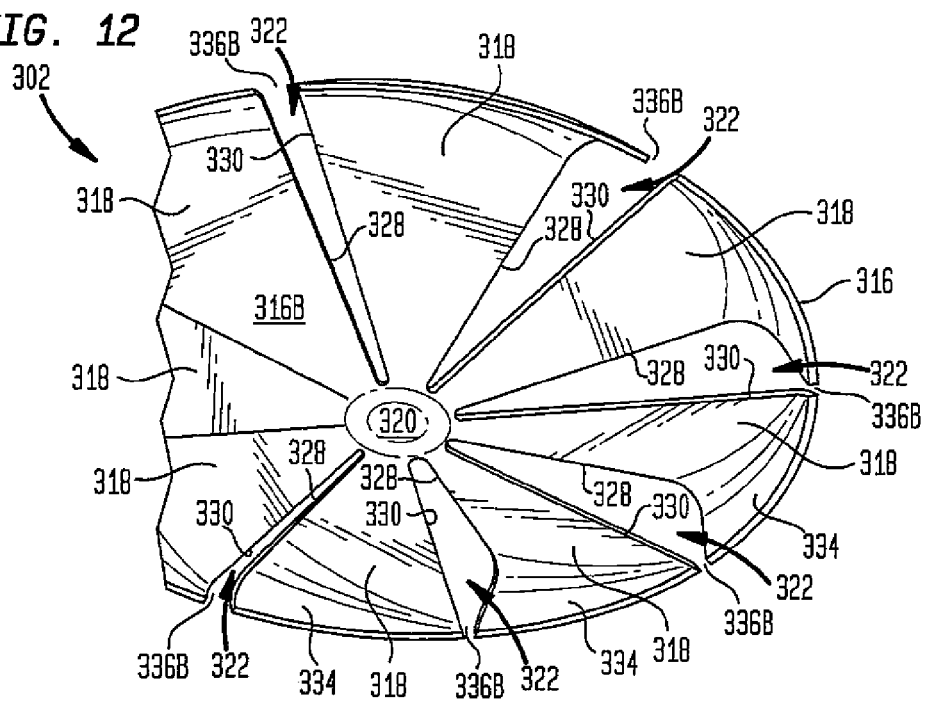
FIG. 12 is a partial perspective bottom view of the stirring apparatus of FIG. 11.

Turning now to FIGS. 11-12, another example embodiment is shown of a stirring apparatus 302 that may be constructed in accordance with the present disclosure. As can be seen, the stirring apparatus 302 is similar in most respects to the stirring apparatus 2 of FIGS. 1-6. This similarity is indicated by the use of corresponding reference numbers (incremented by 300) to indicate corresponding structure. The stirring apparatus 302 differs from the embodiment of FIGS. 1-6 in that the deflector 316 includes a lower contact rim 336 that is discontinuous in nature due to gaps 336B between the outboard ends of the deflector ramps 318 instead of ramp-interconnection segments (elements 36A in FIGS. 1-6). This increases the flexibility of the deflector 316, particularly at the outboard ends of the deflector ramps 318. The advantage of this construction is that the deflector ramps 318 can be flexed downwardly (or upwardly) to reduce the diameter of the deflector 316 to accommodate smaller containers. The advantageous is that a smaller number of differently sized deflectors will fit a larger number of differently sized containers. Note that FIG. 11 shows the deflector 316 with ramp gates 318A whereas FIG. 12 shows the deflector without ramp gates. Thus, either configuration may be used depending design preferences. Note that providing the ramp gates 318A is one way to increase the structural stiffness of the deflector 316.

Figure 13:
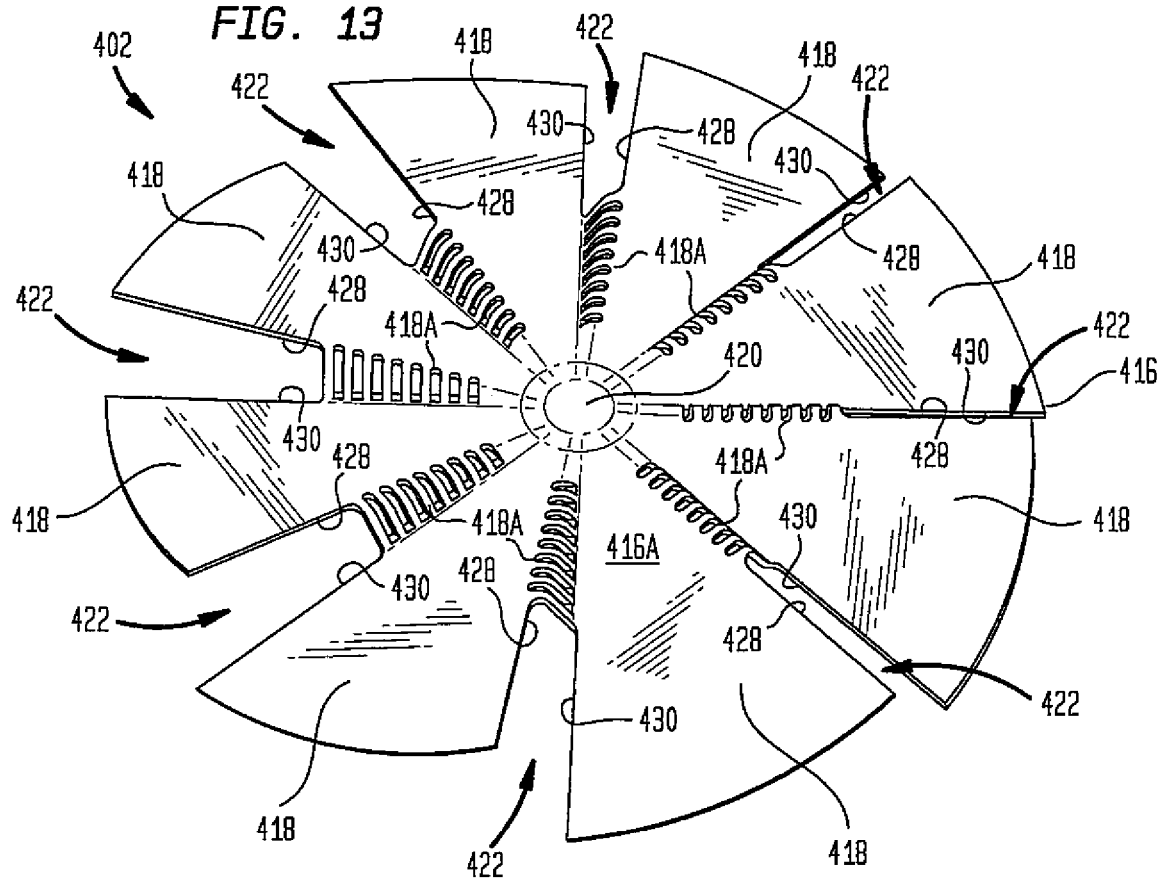
FIG. 13 is a perspective top view showing another alternative stirring apparatus that may be constructed in accordance with the design principles set forth herein.
Figure 14:
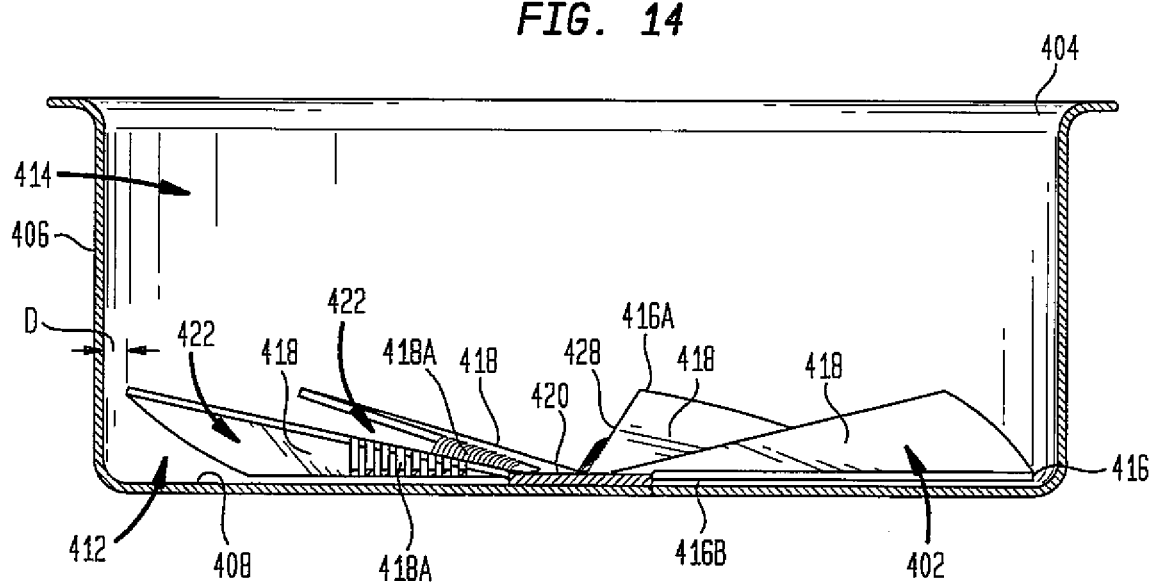
FIG. 14 is a side cross-sectional centerline view showing the stirring apparatus of FIG. 13, with the stirring apparatus being situated in a container in an operational configuration.

Turning now to FIGS. 13 and 14, another example embodiment is shown of a stirring apparatus 402 that may be constructed in accordance with the present disclosure. As can be seen, the stirring apparatus 402 is similar in many respects to the stirring apparatus 2 of FIGS. 1-6. This similarity is indicated by the use of corresponding reference numbers (incremented by 400) to indicate corresponding structure. The stirring apparatus 402 differs from the embodiment of FIGS. 1-6 in that the deflector 416 is configured without an integral peripheral sidewall (element 32 in FIGS. 1-6) and lacks a lower contact rim (element 36 in FIGS. 1-6). In this configuration wherein the deflector 402 lacks an integral sidewall, the deflector may be sized so that its peripheral contour (e.g., a circle) substantially conforms to the contour of the side 406 of the container 404 (e.g., also a circle) and is close enough thereto to form a virtual sidewall (provided by the side 406) that imparts a tangential flow component to the fluid currents and/or vapor bubbles.

Although the deflector 416 in FIGS. 13-14 that does not perfectly conform to the side wall 406 of the container 406, it still blankets a significant portion of the container's heat conductive bottom plate 408, with the gap difference "D" being shown in FIG. 14. The greater the gap difference "D," the more the stirring apparatus 402 will allow for the mixing of some rising fluid currents and vapor bubbles in the lower fluid zone 412 with fluid in the upper fluid zone 414 through the uncovered peripheral space. The tolerance, however, is not so large as to eliminate the whirlpooling effect and offers the user the utility of being able to use a single deflector in containers of various size with slightly different heat conductive bottom plates 408 and side walls 406. In FIG. 14, it will be seen that a friction contact point is still present between the underside of the deflector's central hub 420 and the container's bottom plate 408. If desired, slotted blocking gates 418A may be provided between the deflector ramps 418 to increase the deflector's rigidity.

In the previous embodiments discussed thus far, the various deflectors are configured with a generally concave shape (relative to the upper side of the deflector). A concave shape produces a tendency for the rising fluid currents and bubbles to travel up the underside of the deflector from a central lower portion thereof so as to exit the deflector ramps at an outer portion of the deflector and create a broad whirlpool in the upper fluid. Depending on the desired end use, different geometric shapes for the deflector can be leveraged to harness and take advantage of the physical laws governing buoyancy and thermodynamics, e.g., that hotter fluid constituents and less dense vapor bubbles will rise and cooler fluid constituents will sink.

For example, turning now to FIG. 15, another example embodiment is shown of a stirring apparatus 502 that may be constructed in accordance with the present disclosure. As can be seen, the stirring apparatus 502 has some similarities to the stirring apparatus 2 of FIGS. 1-6. These similarities are indicated by the use of corresponding reference numbers (incremented by 500) to indicate corresponding structure. The stirring apparatus 502 differs from the embodiment of FIGS. 1-6 in that the deflector 516 is configured with a convex shape (relative to the upper side 516A). In this configuration, the central hub portion 520 is taller and higher than the outboard ends of the deflector ramps 518 that are located at the top of the deflector's peripheral side wall 532. The lower edges 530 of the deflector plates 518 are substantially straight and horizontal, as in the previous embodiments. However, the upper edges 528 of the deflector plates 518 are angled downwardly as they emanate from the upper end of the central hub portion 520 and extend radially outwardly and downwardly to join the top of the deflector's peripheral side wall 532. Although not shown, the respective top edges 528 and bottom edges 530 of adjacent deflector plates 518 in this embodiment will typically overlap each other when viewed in plan. The convex shape of the deflector 516 influences the rising fluid currents and/or vapor bubbles to trend toward the center of the upper fluid zone 514, exiting the deflector ramps 518 in a tighter whirlpool motion that is more concentrated than the whirlpool pattern created by a concave deflector.

Turning now to FIG. 16, another example embodiment is shown of a stirring apparatus 602 that may be constructed in accordance with the present disclosure. This embodiment represents a concave configuration. As can be seen, the stirring apparatus 602 is similar in many respects to the stirring apparatus 2 of FIGS. 1-6. This similarity is indicated by the use of corresponding reference numbers (incremented by 600) to indicate corresponding structure. The stirring apparatus 602 differs from the embodiment of FIGS. 1-6 in that the deflector 616 is configured with an upwardly extending peripheral sidewall 632A that terminates at an upper peripheral rim 636A. The peripheral sidewall 632A extends substantially vertically and lies against the inner surface of the container's outer side wall 606. This configuration lengthens the deflector ramps 618 so that they extend further outwardly than the deflector ramps 18 of FIGS. 1-6, thus increasing the radius of the whirlpool motion created by the deflector 616. The peripheral sidewall 632A can be sized to extend upwardly as far as desired. This may be useful for maneuvering the stirring apparatus 602 in and out of the container 604 by providing a larger taller surface for gripping the deflector 616. Also, the peripheral sidewall 632A allows the deflector 616 to serve as a colander of sorts that can be lifted to remove food or other material from the fluid in the container 604. Although the peripheral side wall 632A is shown as having a vertical configuration in FIG. 16, it could also be angled so as to be somewhat conical or bowl shaped. Other sidewall configurations could also be used.

Figure 17:
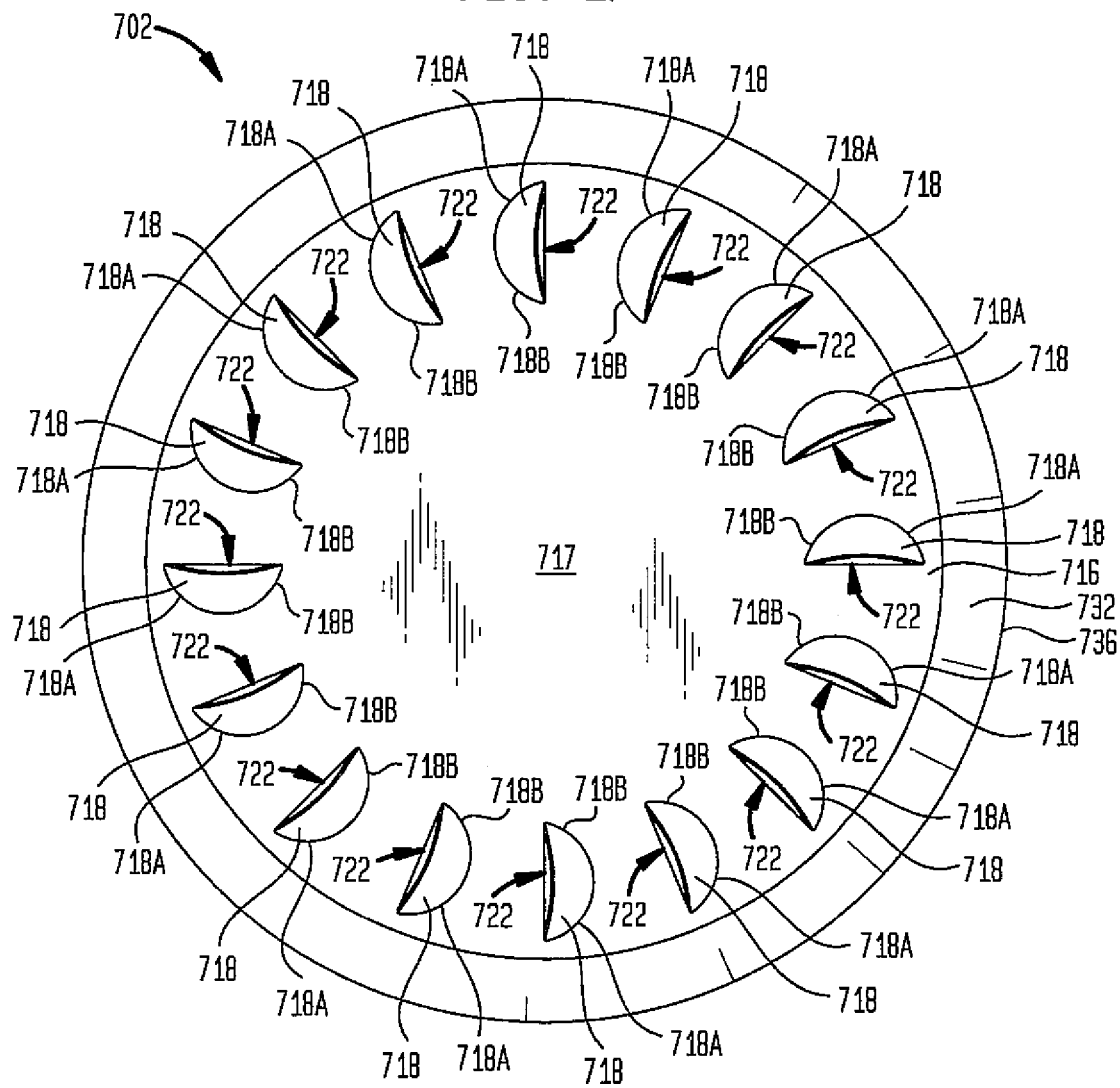
FIG. 17 is a top plan view showing another alternative stirring apparatus that may be constructed in accordance with the design principles set forth herein.
Figure 18:
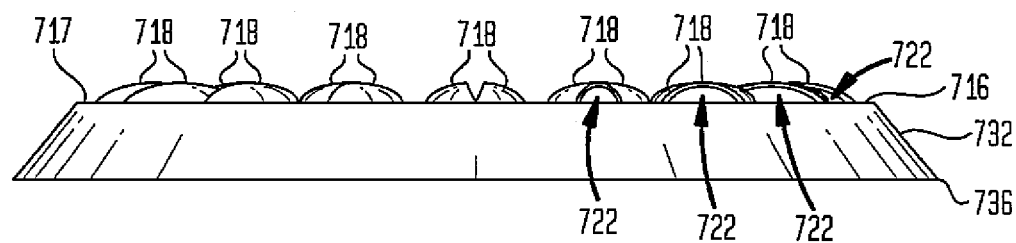
FIG. 18 is a side view of the stirring apparatus FIG. 17.

Turning now to FIGS. 17-18, another example embodiment is shown of a stirring apparatus 702 that may be constructed in accordance with the present disclosure. The stirring apparatus 702 comprises a deflector 716 that differs from the deflector 16 of FIGS. 1-6 in that it is generally flat and has a different deflector ramp construction. In particular, the deflector 716 includes a substantially planar main body portion 717 on which a circular pattern of deflector ramps 718 and vent openings 722 is formed. Other deflector ramp/vent opening pattern could also be used, depending on the desired fluid swirling effect to be achieved. Also, plural deflector ramp/vent opening patterns could be used if desired, such as two or more concentric circular patterns. The deflector 716 also has a peripheral side wall 732 and a lower contact rim 736 arranged to sit on the conductive bottom plate of a container (not shown). Each deflector ramp 718 includes both radial outer and inner sidewall portions 718A and 718B, respectively, such that the resultant vent openings 722 are closed ended. The deflector ramps 718 are configured to redirect rising fluid currents and/or vapor bubbles so that they are forced to travel in a more lateral trajectory. The outer deflector ramp sidewall 718A helps induce a substantial tangential flow component into the fluid currents and/or vapor bubbles by blocking the radial escape thereof. As can be seen in FIG. 18, the deflector ramps 718 have generally curved ramp surfaces. In alternative embodiments, the deflector ramps 718 could have planar ramp surfaces or curved ramp surfaces of different shape that are either concave or convex. It should also be noted that the main body portion 717 of the deflector 716 need not be planar, and instead could be rounded in a concave or convex configuration, or could have other surface configurations.

Accordingly, a static stirring apparatus for automatically stirring fluid has been disclosed. Although example embodiments have been shown and described, it should be apparent that many variations and alternative embodiments could be implemented in accordance with the present disclosure. For example, although the deflectors of the various stirring apparatus described above comprise integral structures in which one or more deflector ramps are interconnected to each other in some way, it would also be possible to use a modular approach in which the one or more deflector ramps are not all interconnected. Also, it would be possible to integrate a deflector with a container to provide a self-stirring container. The deflector could either be removable from the container (e.g., for cleaning) or could be fixedly disposed therein. It is understood, therefore, that the invention is not to be in any way limited except in accordance with the spirit of the appended claims and their equivalents.

What is claimed is:

1. A method for automatically stirring a fluid in a container configured to hold said fluid for boiling, said method comprising:
    (1) introducing a stirring apparatus into said container, said stirring apparatus comprising:
        one or more stationary deflector ramps defining one or more vent openings and configured to impart lateral movement to heated fluid currents and/or vapor bubbles moving upwardly away from a heat conducting bottom of said container and to redirect said fluid currents and/or vapor bubbles into a swirling motion that stirs said fluid without movement of said one or more deflector ramps;
    (2) heating said container bottom to boil said fluid,
    (3) allowing said one or more deflector ramps to remain in a stationary position to impart lateral movement to said heated fluid currents and/or vapor bubbles moving upwardly away from said container bottom so as to stir said fluid without rotation or other movement of said one or more deflector ramps; and
    (4) varying said heating to control an intensity at which said fluid is stirred by said one or more deflector ramps.

2. The method of claim 1, wherein said one or more deflector ramps are part of a deflector structure (deflector) that is removably or fixedly disposed in said container, said deflector comprising:
    an upper side;
    a lower side;
    at least one friction contact point for frictionally engaging said container to prevent movement of said deflector;
    an inner portion configured for placement proximate to a center of said container;
    an outer portion configured for placement proximate to a side of said container; and
    said one or more deflector ramps being arranged so that said one or more vent openings provide one or more fluid pathways from said lower side to said upper side, said one or more vent openings extending generally radially outwardly.

3. The method of claim 1, wherein said one or more deflector ramps are part of a deflector structure (deflector) that is removably or fixedly disposed in said container, said deflector being either concave such that an inner portion of said deflector is lower than an outer portion of said deflector when said deflector rests on said container bottom, or said deflector being convex such that said inner portion is higher than said outer portion when said deflector rests on said container bottom.

4. The method of claim 1, wherein said one or more deflector ramps are part of a deflector structure (deflector) that is removably or fixedly disposed in said container, said deflector comprising a substantially planar main body portion on which a plurality of said one or more deflector ramps are formed in a pattern of plural deflector ramps that define a plurality of said one or more vent openings, a peripheral side wall and a lower contact rim, each of said deflector ramps being configured with radial outer and inner sidewall portions such that said vent openings are closed ended.

5. A method for automatically stirring a fluid in a container configured to hold said fluid for boiling, said method comprising:
    (1) introducing a stirring apparatus into said container, said stirring apparatus comprising:
        one or more stationary deflector ramps defining one or more vent openings and configured to impart lateral movement to heated fluid currents and/or vapor bubbles moving upwardly away from a heat conducting bottom of said container and to redirect said fluid currents and/or vapor bubbles into a swirling motion that stirs said fluid without movement of said one or more deflector ramps;
    (2) heating said container bottom to boil said fluid,
    (3) allowing said one or more deflector ramps to remain in a stationary position to impart lateral movement to said heated fluid currents and/or vapor bubbles moving upwardly away from said container bottom so as to stir said fluid without rotation or other movement of said one or more deflector ramps;
    wherein said one or more deflector ramps are part of a deflector structure (deflector) that is removably or fixedly disposed in said container, said deflector comprising:
    an upper side;
    a lower side;
    at least one friction contact point for frictionally engaging said container to prevent movement of said deflector;
    an inner portion configured for placement proximate to a center of said container;
    an outer portion configured for placement proximate to a side of said container; and
    each of said deflector ramps including an upper edge and a lower edge, said upper and lower edges being arranged such that, when said deflector is situated with said lower edge facing said container bottom and said deflector is seen in a side view orientation looking in a direction that is normal to one of said lower or upper edges, an angle made by said upper edge relative to said container bottom is greater than a corresponding angle made by said lower edge relative to said container bottom.

6. The method of claim 5, wherein said deflector has a central hub portion configured for frictional contact with said container bottom.

7. The method of claim 6, wherein said deflector ramps cover at least 50% of a surface area of said container bottom.

8. The method of claim 7, wherein a gap is maintained between adjacent deflector ramps so that when said deflector is seen in plan view orientation, said upper edge of one deflector ramp will be spaced from said lower edge of an adjacent deflector ramp such that each said vent opening will present an open face that slopes downwardly from said upper edge of said one deflector ramp to said lower edge of said adjacent deflector ramp.

9. The method of claim 5, wherein each of said deflector ramps comprises a deflector ramp surface that extends from a lowermost ramp portion at said lower edge to an uppermost ramp portion at said upper edge that forms a top of one of said deflector vent openings.

10. The method of claim 9, wherein each said deflector ramp surface comprises a gradual upslope both radially and across a chord dimension of said deflector ramp surface, such that each of said vent openings increases in height in an outward direction when said deflector is seen in a side view orientation looking normal to each vent opening's upper edge, and so that each said deflector ramp surface slopes upwardly across said chord dimension from its lower edge to its upper edge.

11. The method of claim 10, wherein each said deflector ramp surface comprises a non-twisting substantially planar deflector ramp surface configuration.

12. The method of claim 11, wherein said deflector ramps are generally pie-shaped.

13. The method of claim 5, wherein said deflector comprises blocking gates blocking radially inner regions of said vent openings.

14. The method of claim 13, wherein said blocking gates comprise fluid-return apertures.

15. The method of claim 5, wherein said deflector comprises one or more central fluid return apertures.

16. The method of claim 5, wherein said deflector comprises one or more integral sidewalls that are either downwardly extending or upwardly extending.

17. The method of claim 5, wherein said deflector has a continuous peripheral rim configured for frictional contact with said container bottom.

18. The method of claim 5, wherein said deflector has a continuous peripheral rim configured for frictional contact with a sidewall portion of said container, said peripheral rim extending upwardly to an upper edge of said container sidewall portion, and wherein said introducing comprises gripping said peripheral rim while lowering said deflector into said container.

19. A method for automatically stirring a fluid, said method comprising:
  (1) introducing said fluid into a container having a stirring apparatus therein, said stirring apparatus comprising:
    one or more deflector ramps arranged to remain stationary in said container during said stirring, said one or more deflector ramps defining one or more radially-extending vent openings in said stirring apparatus, each of said one or more vent openings facing in a substantially tangential direction and having an inner end and an outer end that are radially separated from each other such that said vent opening inner end is more proximate to a radial inner portion of said stirring apparatus and said vent opening outer end is more proximate to a radial outer portion of said stirring apparatus, said one or more deflector ramps being configured to impart lateral movement to heated fluid currents and/or vapor bubbles moving upwardly away from a heat conducting bottom of said container and to redirect said fluid currents and/or vapor bubbles through said one or more vent openings into a swirling motion that stirs said fluid without movement of said one or more deflector ramps; and
  (2) activating a heat source below said container bottom to boil said fluid and generate said fluid currents and/or vapor bubbles.

* * * * *